United States Patent Office 3,358,615
Patented Dec. 19, 1967

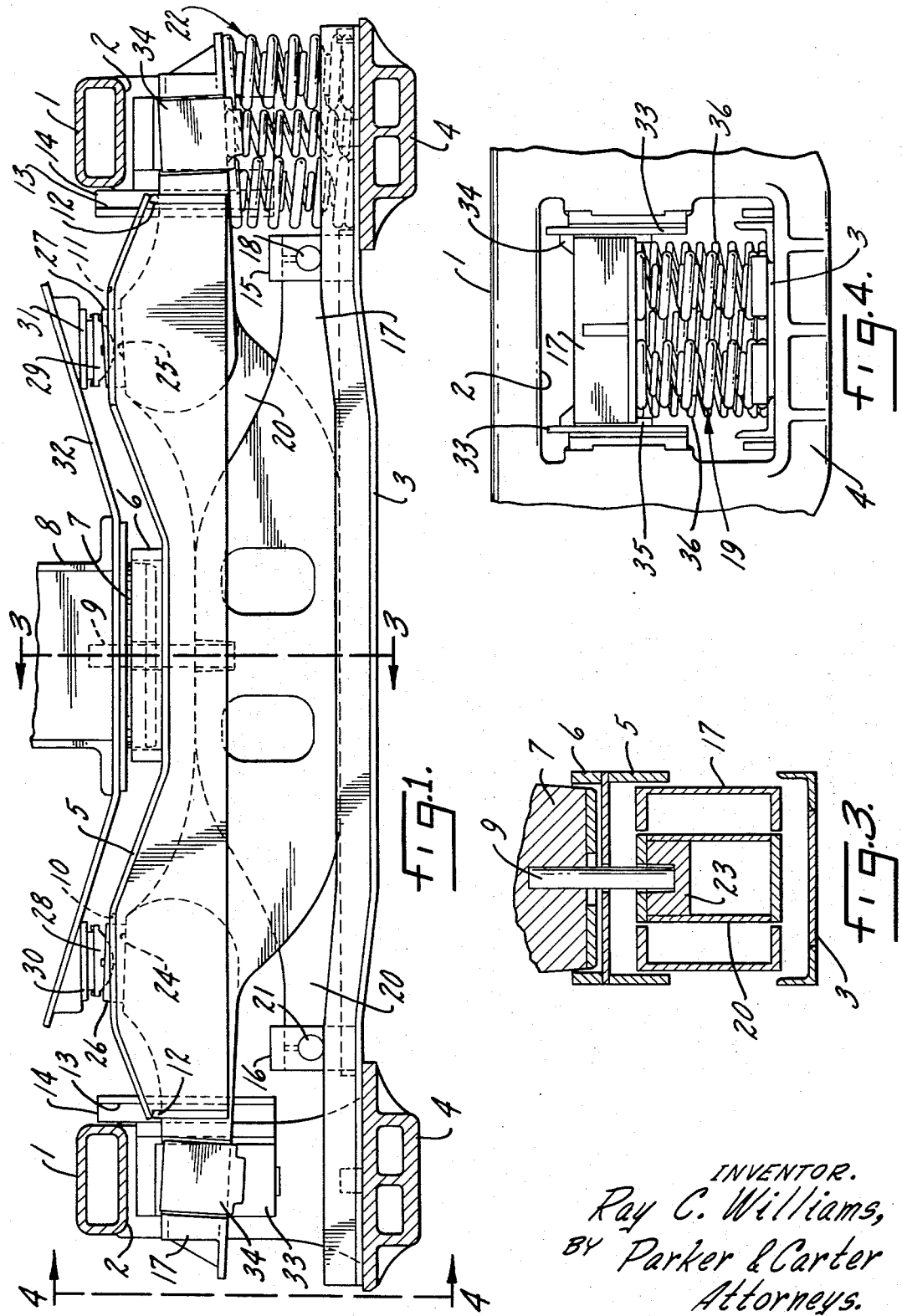

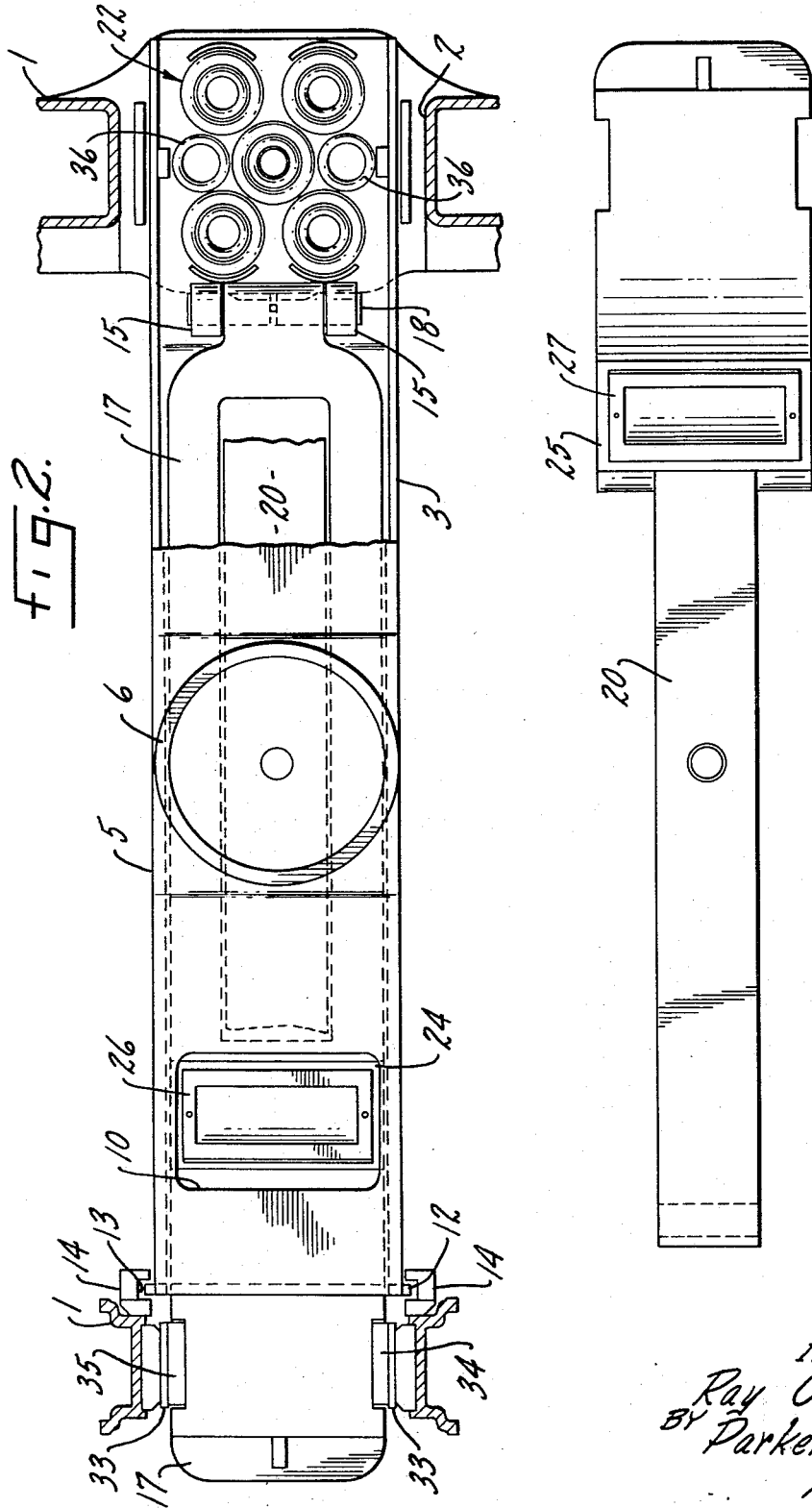

3,358,615
EQUALIZING SPRING BOLSTER FOR RAILROAD CARS
Ray C. Williams, Chicago, Ill., assignor to Standard Car Truck Company, Chicago, Ill., a corporation of New Jersey
Filed July 28, 1965, Ser. No. 475,348
4 Claims. (Cl. 105—197)

ABSTRACT OF THE DISCLOSURE

In a railroad car truck, a center plate which centers the car body on the truck but which at no time carries any of the load of the car. The weight or load of the car is applied to scissors bolsters, each bolster being pivoted at one end on a truck frame spring supported at the other end on the opposite truck frame with the car load applied to the two bolsters adjacent the spring supported end.

---

This invention relates to improvements in double bolster railroad car trucks and has for one object to provide in a railroad car truck means adjacent one frame of the car truck for yieldingly resisting roll of the car toward that frame while simultaneously applying a pressure or downward vertical force on the side frame opposite the force point so as to add to the forces which tend to keep the light side wheels on the rail.

Another object is to provide spring means widely spaced from the center of the truck for resisting roll of the car throughout its entire range of operation.

Another object is to provide a multi-part bolster truck frame wherein car load is applied to the truck at two widely spaced points spaced from the center plate and between it and the side frames.

Another object is to provide in a bolster assembly two bolster levers extending across the truck in opposite directions, each lever being spring supported on a truck frame at one end and provided with an unsprung connection or hinge at its opposite end on the lower chord of the opposite side frame.

This application discloses an invention suggestive of my co-pending application Ser. No. 391,318, filed Aug. 21, 1964, entitled "Equalizing Bolster for Railroad Cars" but differing from it in that the fulcrum pin in the center of the two bolsters to cause them to function like a scissors is omitted.

Other objects will appear from time to time throughout the specification and claims.

The invention is illustrated more or less diagrammatically in the accompanying drawings, wherein:

FIGURE 1 is a side elevation in part section;
FIGURE 2 is a plan view in part section;
FIGURE 3 is a section along the line 3—3 of FIGURE 1;
FIGURE 4 is an end elevation of the bolster assembly viewed along the line 4—4 from the left of FIGURE 1 with parts of the side frame included;
FIGURE 5 is a top plan view of one of the lever bolsters.

Like parts are indicated by like numerals throughout the specification and drawings.

The railroad car truck includes two side frames 1 windowed at 2, there being one frame at each side of the truck, the frames being supported on any suitable journals riding on two or more axles extending across the truck in the usual manner and supported on the usual flanged wheels. The details are conventional and uniform and so in the interest of simplicity are not illustrated.

A spring plank 3 extends across the truck through each of the windows 2, rests on the lower chord 4 of the side frame and is pinned or otherwise attached at each end to the side frame. A transverse bolster 5 extends across the car truck between the two side frames above the spring plank. The bolster carries a truck center plate 6 loosely penetrated by the car center plate 7 depending downwardly from the railroad car center sill 8. The center pin 9 is concentric with the two center plates and aids in holding them in concentricity independent of relative vertical displacement of car and truck.

The transverse bolster is apertured at 10 and 11 for purposes as will hereinafter appear. The transverse bolster is channel shaped as indicated especially in FIGURE 3. At each end of the transverse bolster there projects laterally splines 12 which travel in vertical grooves 13 defined by vertical brackets 14 on opposite sides of the windows 2 so that the transverse bolster may move up and down with respect to the side frame but will be held generally in perpendicularity with respect thereto.

Extending upwardly from the spring plank 3 adjacent each side frame are hinge brackets 15, 16. A bifurcated or fork-shaped bolster lever 17 is hinged on the bracket 15 by a hinge pin 18 and extends diagonally upward toward the frame on the other side of the truck projecting through the window 2 and resting upon the load supporting coil spring assembly 19, as shown in FIGURE 4, which rests at its lower end upon the end of the spring plank 3.

A bolster lever 20 is hinged on the hinge bracket 16 by means of a hinge pin 21 and extends upwardly across the car truck between the forks of the lever 17 to extend through the window 2 on the opposite truck frame, being supported by load supporting coil spring assembly 22. The bolster lever 20 carries a center pin block 23 in which the lower end of the center pin 9 is socketed.

The transverse bolster, resting on the bolster levers, moves up and down with them, thereby maintaining substantially the same position relative to the body side bearings and body center plate, thus, as car body moves up and down relative to truck side frames, there is no interference of car body with transverse bolster parts. Transverse bolster movement is guided by vertical brackets 14.

The transverse bolster 5 which overlies the bolster levers 17 and 20 extend downwardly on both sides thereof and rests at each end on one of the bolster levers. A rounded downwardly extending lip 12a extends across the bolster lever 5 between the side walls thereof to rest upon one or other of the bolster levers so that as the lever rotates, this rounded lip at the end of the transverse bolster permits up and down movement of the transverse bolster and rotary movement of the lip without substantial interference.

Projecting upwardly from the upper side of each of the bolster levers, terminating below but in register with the apertures 10 and 11 in the transverse bolster, are load carrying assemblies which include bosses 24 and 25 which carry channeled rocker blocks 26 and 27 to receive rocker side bearings 28 and 29 in contact with body side bearings 30 and 31 on the car bolster 32.

The opposite walls of the windows 2 are faced by removable wear plates 33 which are engaged by friction wedges 34 and 35 in pockets in the outboard ends of the bolster levers and are pressed upwardly into frictional contact with the bolster levers and the wear plates by the side coil springs 36 thereby exerting a friction resistance to damp out vertical movement of the upper ends of the two levers.

The use and operation of the invention are as follows:
The center pin and the center plates permit free up and down relative movement between the car and the bolster and levers while maintaining a proper pivot relationship between the car and the truck. The load supporting springs in each truck frame support yieldably the outboard upper ends of each of the levers. The lower ends of each lever are pivoted but not spring supported at the point where load is applied by them on the truck frames.

Because the rocker side bearings apply load from the car to each of the levers, the weight of the car is supported by the springs and the levers. As the load varies the springs are compressed and a cushion effect is accomplished. As each lever rotates about its hinge pin, the spring gives adequate cushioning for the car and thus the spring effect is balanced on both sides of the truck and since the load is applied at points widely spaced from the pivot center of the car, a stable situation is approached.

As the car goes about a curve or passes over a low rail joint and tends to roll outwardly to the left in FIGURE 1 for example, greater load is applied through the body side bearing 30 than through the body side bearing 31 and the springs 19 are more compressed than the springs 22 but such increase of pressure adjacent the spring supported end of the lever 17 also increases to a lesser degree the pressure applied through the bracket 15 tending to hold the other truck frame down. To be sure because the lever arm from pivot to rocker side bearing is many times longer than the lever arm from side bearings to springs, this unsprung load and the pressure applied to the car truck is much less than the pressure applied to the truck on the opposite side but is nevertheless enough to help to hold down the lightly loaded side of the truck.

Preferably the lower end or fulcrum end of each lever is unsprung but it might be sprung or cushioned. The important thing is that the shorter arm of the lever is between the point of application of the car load on the lever and the coil or other springs between it and the truck frame. The long arm of the lever extends between the point of application of the car load and the truck on the other side of the car as it tends to roll toward the nearest truck frame, is also represented in a lesser pressure applied to the truck frame on the light side.

I claim:
1. A railroad car truck, having spaced, parallel side frames, a lever pivoted on each side frame, extending inwardly across the truck toward the other side frame, each lever being, free and independent of the other lever, to rotate about its own pivot axis, yielding load carrying means interposed between the free end of each lever and the adjacent side frame, load carrying assemblies on each lever adjacent the spring supported end thereof.

2. The device of claim 1 characterized by the fact that a transverse bolster extends across the truck between the side frames and carries a center plate element adapted to mesh with a center plate element on a railroad car, to permit free up and down relative movement of the car and the truck.

3. The device of claim 1 characterized by the fact that a transverse bolster extends across the truck between the side frames and is apertured in register with the load carrying assemblies, a car bolster carrying a load carrying assembly in register with each of the load carrying assemblies on the levers.

4. The device of claim 3 characterized by the fact that the load carrying assemblies include bosses carrying channelled rocker blocks receiving rocker side bearings on the car bolster.

References Cited

UNITED STATES PATENTS

| | | | |
|---|---|---|---|
| 317,822 | 5/1885 | McEwen | 105—197 |
| 404,676 | 6/1889 | Blaine | 105—202 |
| 1,144,392 | 6/1915 | Summers | 105—197 |
| 1,212,987 | 1/1917 | Morrow | 280—112 |
| 1,237,166 | 8/1917 | Burrmann | 105—203 |
| 1,588,582 | 6/1926 | Jablow | 105—199 |
| 1,916,145 | 6/1933 | Hedgcock | 105—208 |
| 2,737,908 | 3/1956 | Williams | 105—227 |
| 2,862,459 | 12/1958 | Miller et al. | 105—208.2 |

FOREIGN PATENTS

| | | |
|---|---|---|
| 641,915 | 2/1937 | Germany. |
| 14,039 | 6/1913 | Great Britain. |

ARTHUR L. LA POINT, *Primary Examiner.*

H. BELTRAN, *Assistant Examiner.*